(12) United States Patent
Thompson et al.

(10) Patent No.: US 10,070,409 B2
(45) Date of Patent: Sep. 4, 2018

(54) CLUSTER TRACKING SYSTEM

(71) Applicant: Wal-Mart Stores, Inc., Bentonville, AR (US)

(72) Inventors: John Paul Thompson, Bentonville, AR (US); Robert C. Taylor, Rogers, AR (US); Donald High, Noel, MO (US); Michael Dean Atchley, Springdale, AR (US)

(73) Assignee: Walmart Apollo, LLC, Benton, AR (US)

( * ) Notice: Subject to any disclaimer, the term of this patent is extended or adjusted under 35 U.S.C. 154(b) by 0 days.

(21) Appl. No.: 15/439,418

(22) Filed: Feb. 22, 2017

(65) Prior Publication Data

US 2017/0245237 A1 Aug. 24, 2017

Related U.S. Application Data

(60) Provisional application No. 62/298,626, filed on Feb. 23, 2016.

(51) Int. Cl.

| H04W 24/00 | (2009.01) |
| H04W 64/00 | (2009.01) |
| H04W 4/04 | (2009.01) |
| H04W 4/029 | (2018.01) |
| H04W 4/80 | (2018.01) |

(52) U.S. Cl.
CPC ........... *H04W 64/00* (2013.01); *H04W 4/029* (2018.02); *H04W 4/04* (2013.01); *H04W 4/80* (2018.02)

(58) Field of Classification Search
CPC ....... H04W 64/00; H04W 4/008; H04W 4/04; H04W 84/12

USPC ...................................................... 455/456.1
See application file for complete search history.

(56) References Cited

U.S. PATENT DOCUMENTS

| 5,557,513 A | 9/1996 | Frey et al. |
| 7,240,027 B2 | 7/2007 | McConnell et al. |
| 9,167,554 B1 * | 10/2015 | Sjolund ................ G01S 5/00 |
| 2008/0318591 A1 * | 12/2008 | Oliver .................. G01S 3/46 |
| | | 455/456.1 |
| 2013/0238378 A1 | 9/2013 | Connolly et al. |
| 2014/0018059 A1 * | 1/2014 | Noonan ............... H04W 48/04 |
| | | 455/419 |
| 2014/0045517 A1 | 2/2014 | Marti et al. |
| 2014/0066089 A1 * | 3/2014 | Monks .................. H04W 4/22 |
| | | 455/456.1 |
| 2014/0172476 A1 | 6/2014 | Goulart |

(Continued)

*Primary Examiner* — William Nealon
(74) *Attorney, Agent, or Firm* — McCarter & English, LLP; David R. Burns

(57) ABSTRACT

Described in detail herein are systems and methods for tracking clusters of user devices within a facility. In exemplary embodiments, a plurality of network devices are distributed within a facility. The network devices may receive connection data indicating probing by at least one of a plurality of user devices within the facility. A processing unit may be coupled to the network devices and the processing unit may extract location data from the connection data received by the network devices. The location data may indicate the location of the user devices with respect in the facility. The processing unit may determine a projected path for the plurality of user devices based on the location data. The processing unit may generate a response based on then projected path of the plurality of user device.

18 Claims, 4 Drawing Sheets

(56) References Cited

U.S. PATENT DOCUMENTS

| | | |
|---|---|---|
| 2014/0236653 A1 | 8/2014 | Farrell |
| 2014/0257889 A1 | 9/2014 | Ashley, Jr. et al. |
| 2014/0340405 A1* | 11/2014 | dos Santos ........... G06T 11/206 |
| | | 345/440 |
| 2015/0025936 A1 | 1/2015 | Garel et al. |
| 2015/0341754 A1* | 11/2015 | Gooch .................... H04W 4/04 |
| | | 455/456.3 |
| 2016/0364472 A1* | 12/2016 | Bak ................... G06F 17/30601 |

* cited by examiner

CLUSTER TRACKING SYSTEM

CROSS-REFERENCE TO RELATED PATENT APPLICATIONS

This application claims priority to U.S. Provisional Application No. 62/298,626 filed on Feb. 23, 2016, the content of which is hereby incorporated by reference in its entirety.

BACKGROUND

Maintaining the correct amount of resources at every location within a facility may be difficult because the lack of knowledge of the movement of users within the facility. As a result, it can be difficult to objectively determine the number of associates needed at a checkout area, or to determine when a shelf should be re-stocked.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
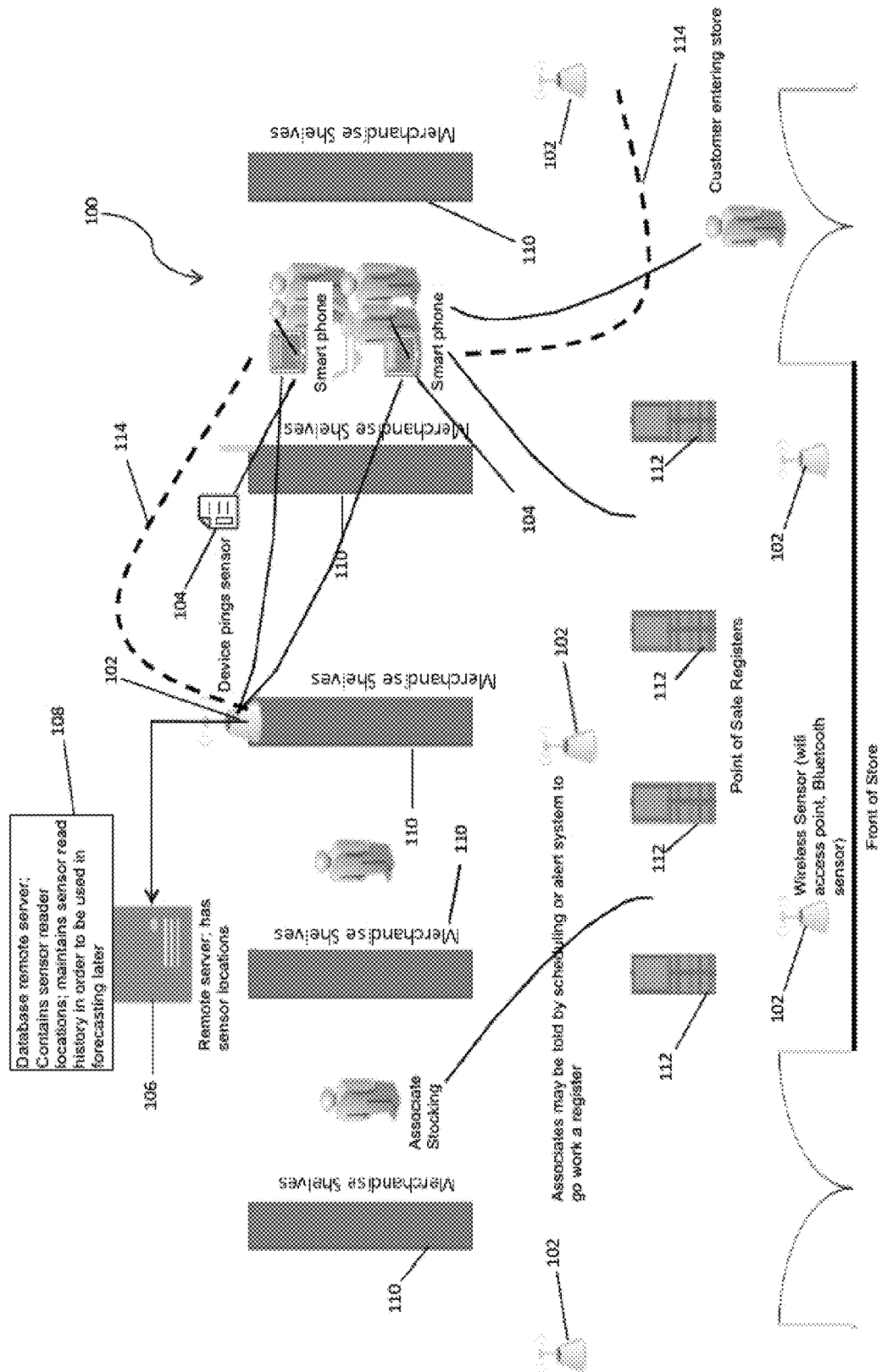
FIG. 1 is a block diagram illustrating user devices within the facility and an interaction of the user devices with network devices distributed throughout a facility according to exemplary embodiments of the present disclosure.

Described in detail herein are systems and methods for tracking user devices within a facility. In exemplary embodiments, a plurality of network devices are distributed within a facility. The network devices may receive connection data indicating probing by at least one of a plurality of user devices within the facility. A processing unit may be coupled to the network devices and the processing unit may extract location data from the connection data received by the network devices. The location data may indicate the location of the user devices with respect in the facility. The processing unit may determine a projected path for the plurality of user devices. The processing unit may determine if more than a predetermined threshold amount of user devices are moving toward an expected location. The processing unit may generate a response based on then projected path of the plurality of user devices.

Exemplary embodiments of the present disclosure include systems and methods, for tracking clusters of user devices. For example, exemplary embodiments of the present disclosure can include network devices distributed throughout a facility, each network device of the plurality of network devices being configured to receive connection data indicative of probing by at least one user device to establish a connection one. A processing unit communicatively coupled to the network devices. The processing unit is programmed to analyze the connection data using a predefined set of user device clustering rules, extract location data from the connection data, wherein the location data is indicative of a location as a function of time of the at least one user device relative to the facility, determine a projected path of movement relative to the facility of the at least one user device, based on the analysis of the connection data and the location data and generate instructions indicative of a specified response to a trigger event based on the analysis of the connection data using the predefined set of user device clustering rules and the projected path of the at least one user device.

As used herein, the term "probing" encompasses attempts to establish a connection using passive means (such as but not limited to a user device listening for network devices which are broadcasting themselves) or active means (such as but not limited to a user device sending out probe request packets in search of a network device).

The capability of tracking clusters of user devices within a facility as described herein can assist in maintaining the correct or optimal amount of resources within the facility, such as but not limited to, the number of associates needed at a checkout area, to determine what items on a shelf or in a modular unit need to be re-stocked, the degree of success of a type of item display, or other quantifiable metric of performance in the facility.

In exemplary embodiments, the user device is a plurality of user devices, and the processing unit is further programmed to determine if more than a predetermined number of the plurality of user devices are moving towards a specified location relative to the facility within a predetermined period of time.

In exemplary embodiments, the plurality of network devices includes one or more of: a wireless local area network access point, a near field communication access point, or a beacon sensor.

In exemplary embodiments, the at least one user device can be one or more of: a mobile phone, a portable digital assistant, a laptop computer, a tablet device, wearable computing device or a wireless portable device.

In exemplary embodiments, the processing device can be further programmed to locate the at least one user device by extracting connection data of two or more network devices that have received connection data associated with a single user device.

In exemplary embodiments, the response can be one or more of: issuing an alert indicating the projected path of the at least one user device, issuing an alert indicating that more than a predetermined threshold number of user devices are moving towards an expected location, and issuing an alert indicating that more than a predetermined threshold number of user devices are moving towards an item scanning location.

In exemplary embodiments, wherein the item scanning location can be at least one Point-of-Sale (POS) system. The at least one processing unit determines the response based on a computation of an expected wait time at the at least one POS system being greater than a predetermined threshold wait time.

In exemplary embodiments, in response to determining the expected wait time could be greater than the predetermined threshold wait time, the at least one processing unit can be further programmed to issue an alert indicating the expected wait time.

In exemplary embodiments, the network devices can be distributed throughout the facility in at least one of: a clustered pattern relative to a location of one or more items in the facility, or a gridded pattern.

FIG. 1 is a block diagram illustrating user devices within a facility and an interaction of the user devices with network devices distributed throughout the facility according to exemplary embodiments of the present disclosure. In exemplary embodiments, a plurality of network devices 102 are distributed throughout a facility 100. The network devices 102 may be WiFi receivers, Bluetooth access points, beacon sensors or other Near Field Communications (NFC) devices. Each network device 102 may be configured to receive connection data indicative of probing by at least one user device 104 to establish a connection. For example, a user device 104 may search for the closest network devices 102. As shown in FIG. 1 a user device 104 may detect a network device 104 shown by the route of the network signal 114. The user device 104 may detect one or more network devices 102 if the user device moves in the range of the network devices 102. The user device 104 may prompt the user if it is attempting to connect to the detected network devices 102. In exemplary embodiments, probing may occur when the network device 102 detects a handshake between the user device 104 and network device 102. As used herein, the term "handshake" refers to an automated process of data exchange that dynamically sets parameters of a communications channel established between two entities before normal communication over the channel begins. Handshaking can exchange data regarding parameters that are acceptable to equipment and systems at both ends of the communication channel, including, but not limited to, information transfer rate, coding alphabet, parity, interrupt procedure, and other protocol or hardware features. Handshaking can be implemented as a technique of communication between two entities. In exemplary embodiments, the network device 102 does not need the user device 104 to establish a full connection with the network device 102 for the network device 102 to detect the handshake as an attempt at "probing". The network device 102 detects the user device 104 acknowledging that a network device 102 is available for connection as the attempt at "probing".

In exemplary embodiments, at least one processing unit 106 is communicatively coupled to the plurality of network devices 102. The processing unit 106 includes a database 108. The database 108 stores the connection data. The processing unit 106 collects and analyzes the connection data from a plurality of user devices 104 using a predefined set of user device clustering rules. The processing unit 106 extracts location data from the connection data. The location data represents the location within the facility 100 where the network device 102 detected a handshake connection with the user device 104. The processing unit 106 determines a projected path of movement relative to the facility 100 of the at least one user device, based on the analysis of the connection data and the location data. For example, the user device 104 may automatically cycle as the it moves throughout the facility 100 to detect various network devices 102. The network devices 102 may detect different handshake data at various locations for the same user device 104. Based on the different location data for the same user device 102, received by the processing unit 106 the processing unit 106 may be able to calculate a projection of the direction the user device 104 is moving and thus, determine a projected path for the user device 104.

As mentioned above, the network devices 104 may detect a plurality of user devices 104 based on the handshake connection. The processing unit 106 may analyze the connection and location data for a plurality of user devices 104 based on a predefined set of user device clustering rules. For example, the processing unit 106 may determine a cluster of connection data from multiple user devices 104 in a single location within the facility 100. The processing unit 106 may determine a projected path for the multiple user devices 104 in the cluster and determine that more than predetermined threshold number of user devices are headed toward a particular direction within the facility 100. In exemplary embodiments, the predetermined threshold number may be any number greater than 0 representing a cluster of user devices. In exemplary embodiments, a cluster of user devices may be an amount of user devices more than the predetermined threshold amount within a predetermined distance of each other for a same predetermined threshold of time. In exemplary embodiments the facility may be a retail store, library, airport or warehouse. The processing unit 106 may generate instructions indicative of a specified response to a trigger event based on the analysis of the connection data using the predefined set of user device clustering rules and the projected path of multiple user device. For example, the processing unit 106 may issue an alert indicating the projected path of the at least one user device 104, issue an alert indicating that more than a predetermined threshold number of user devices 104 are moving towards an expected location, and/or issue an alert indicating that more than a predetermined threshold number of user devices 104 are moving towards an item scanning location. In exemplary embodiments, the expected location may be a merchandise shelf 110 where the items are out of stock. The processing unit 106 may issue an alert (such as but not limited to, to an employee, supervisor, or manager) that a cluster of user devices 104 is moving toward a merchandise shelf 110 where items are out of stock, based on the determined projected path.

In exemplary embodiments, the facility 100 may be a retail store and the item scanning location may be a Point-of-Sale (POS) system 112. The processing unit 106 may detect a cluster of user devices 104 moving towards the POS system 112 based on the determined projected path. The processing unit 106 determines the response based on a computation of an expected wait time at the at least one POS system 112 being greater than a predetermined threshold wait time. The processing unit 106 can calculate the wait time at the POS system 112 based on the cluster of user devices 104 moving toward the POS system 112. In exemplary embodiments, the processing unit 106 may issue an alert (such as but not limited to, to an employee supervisor, or manager of a retail store) indicating that the expected wait time is computed to be greater than a predetermined threshold amount.

In exemplary embodiments, the user devices 104 may be a mobile phone, a portable digital assistant, a laptop computer, a tablet device, a wearable computing device or a wireless portable device. The network devices 104 may be distributed throughout the facility 100 in at least one of a clustered pattern relative to a location of one or more items in the facility 100 or a gridded pattern. The clustered pattern may assist in determining a projected path of a cluster of user devices 104 headed to important locations throughout the facility 100. The gridded pattern may assist in providing the user devices 104 with a stronger network connection within the facility 100.

As a non-limiting example implementation, tracking clusters of user devices 104 may determine the movement of users, including clusters or crowds of users, within a facility 100. One or more user devices 104 may be associated with a user in the facility 100. The processing unit 106 may determine a projected path for each one of the user devices 104 as it moves within the facility. Based on the projected path of the user devices 104 the processing unit 106 may determine that more than a predetermined threshold of users may be moving towards an specific location, within a predetermined distance from each other and within a predetermined amount of time. The processing unit 106 device may determine that more than predetermined threshold number of users can be classified as a "crowd" of users. The processing unit 106 may generate a response based on the determination that a certain number of users, or a crowd of users, are moving toward an expected location within the facility 100. For example, the facility 100 may be a retail store and the crowd of users may be customers moving toward a merchandising shelf 110 (such as but not limited to a display unit). The example system can be used to determine whether or not merchandising shelf 110 has enough stock of items as compared to the quantity of users moving toward the merchandising shelf 110, based on the user device probing of network devices. Based on the analysis, the processing unit 106 may issue an alert (e.g., to a staff member, supervisor, manager, or employee) of the retail store relative to the time the number of uses, or the crowd of users, arrive at the merchandising shelf 110. The alert may issue an alert or other notification (e.g., to inform the staff member, supervisor, manager, or employee) to restock the merchandising shelf 110 so that users face sufficient items or minimal delay in re-stocking those items. In another example, the processing unit 106 may determine the number of uses, or crowd of users, is heading toward the POS systems within the retail store. The retail store may have several POS systems 112, however, not all of the POS systems 112 may be active at the same time (i.e., that can be used to complete a purchase or other activity). The processing unit 106 may compare the quantity of the number of uses, or the crowd of users, moving toward the POS systems 112, and the number of POS systems 112 that are active. Based on the comparison the processing unit 106 may calculate the approximate wait time for the number of uses, or the crowd of users, at the POS systems 112. The processing unit 106 may determine that the wait time may be longer than a pre-determined threshold of time, and in response the processing unit 106 may issue an alert (e.g., to a staff member, supervisor, manager, or employee of the retail store) relative to the time the number of users, or the crowd of users, are expected to reach the POS systems 112, to activate more POS systems 112 and/or to reduce the wait time for the users at the POS systems 112.

Figure 2:
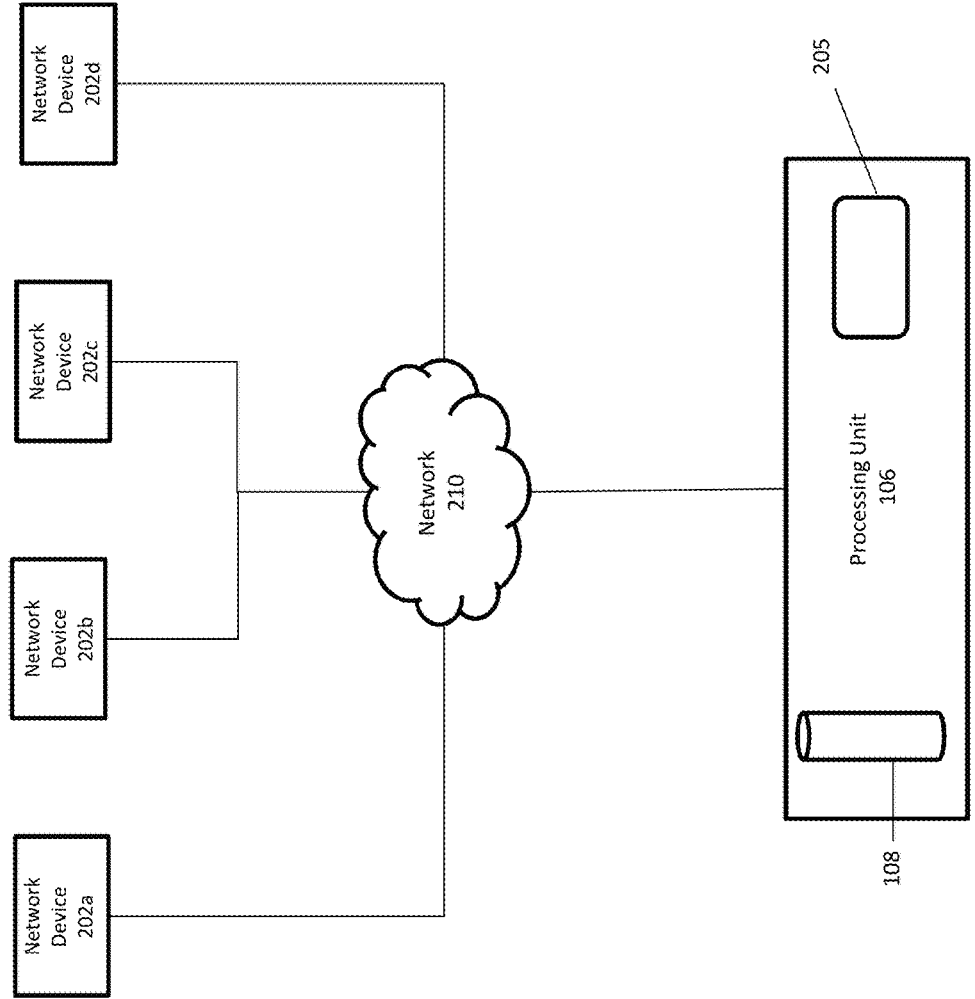
FIG. 2 illustrates an exemplary environment for a tracking system within a facility in accordance with exemplary embodiments of the present disclosure.

FIG. 2 illustrates an exemplary environment for tracking system within a facility in accordance with exemplary embodiments of the present disclosure. In exemplary embodiments, a plurality of network devices 202*a-d* are distributed throughout a facility 100. The network devices 202*a-d* may be, but is not limited to, WiFi receivers, Bluetooth access points, beacon sensors or other Near Field Communications (NFC) devices. Each network device 202*a-d* may be configured to receive connection data indicative of probing by the user devices 104 (as shown in FIG. 1) to establish a connection. For example, at least one user device 104 may search for the closest network devices 202*a-d*. The at least one user device 104 may detect network device 202*b* as it moves into the range of the network device 202*b*. In other embodiments, the at least one user device 104 may also detect network device 202*a* based on the strength of the network connection of the network device 202*a*. The at least one user device 104 may issue a request to the user to confirm if they wish to connect to the detected network device 202*b*. In exemplary embodiments, the network device 202*b* may detect a handshake as a form of probing between the at least one user device 104 and network device 202*b*. The automated process of data exchange of the handshake can dynamically set parameters of a communications channel established between two entities before normal communication over the channel begins. In exemplary embodiments, the network device 202*b* does not need the at least one user device 104 to establish a full connection with the network device 202*b* for the network device 202*b* to detect the handshake as a form of probing. The network device 202*b* detects the at least one user device 104 acknowledging that a network device 202*b* is available for connection.

In exemplary embodiments, at least one processing unit 106 is communicatively coupled to the plurality of network devices 202*a-d*. The processing unit 106 includes a database 108 and a server 205. The processing unit is connected to the plurality of network devices 202*a-d* through the communications network 210. In an example embodiment, one or more portions of communications network 210 can be, but is not limited to, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The processing unit 106, the server 205 and the database 108 are connected to the network 210 via a wired connection. Alternatively, processing unit 106, the server 205 and the database 108 can be connected to the network 210 via a wireless connection. In exemplary embodiments, the database 108 stores the connection data. The processing unit 106 collects and analyzes the connection data from a plurality of user devices 104 using a predefined set of user device clustering rules. The processing unit 106 can be configured to extract location data from the connection data. The location data represents the location within the facility 100 where the network device 202*a-d* detected a handshake connection with the user device 104. The processing unit 106 determines a projected path of movement relative to the facility 100 of the at least one user device, based on the analysis of the connection data and the location data. For example, the user devices 104 may automatically cycle as the user device 104 moves throughout the facility 100 to detect various network devices 202*a-d*. The at least one user device 104 may detect network device 202*b* at one point and afterwards detect network device 202*a* as it moves within the range of network device 202*a*. Based on the different location data for the same user device 104 received by the processing unit 106, the processing unit 106 may be able to project the direction the at least one user device 104 is moving and thus, determine a projected path for the at least one user device 104. In exemplary embodiments, the processing unit 106 can locate the at least one user device 104 by extracting connection data of two or more network devices 202*a-b* that have received connection data associated with the at least one user device 104.

As previously mentioned, the network devices 202*a-d* may detect a plurality of user devices 104 based on the handshake connection. The processing unit 106 may analyze the connection and location data for a plurality of user devices 104 based on a predefined set of user device clustering rules. For example, the processing unit 106 may determine a cluster of connection data from various user devices 104 are in a single location within the facility 100. In exemplary embodiments, a cluster of user devices may be an amount of user devices more than the predetermined threshold amount within a predetermined distance of each other for a same predetermined threshold period of time. The processing unit 106 may determine a projected path for the plurality of user devices 104 in the cluster and determine a more than predetermined number of user devices are headed toward a particular direction within the facility 100. For example if the user devices 104 have a similar projected path, the processing unit 106 may determine that a cluster of user deices 104 may be headed towards an expected location. In exemplary embodiments the facility 100 is a retail store, library, airport or warehouse. The processing unit 106 may generate instructions indicative of a specified response to a trigger event based on the analysis of the connection data using the predefined set of user device clustering rules and the projected path of the at least one user device. For example, the processing unit 106 may issue an alert indicating the projected path of the user devices 104, issue an alert indicating that more than a predetermined threshold number of user devices 104 are moving towards an expected location, and issue an alert indicating that more than a predetermined threshold number of user devices 104 are moving towards an item scanning location.

In exemplary embodiments, the facility 100 may be a retail store and the item scanning location is at least one Point-of-Sale (POS) system 112 (as shown in FIG. 1). The processing unit 106 may detect a cluster of user devices 104 moving towards the POS system 112 based on the determined projected path. The processing unit 106 determines the at least one processing unit 106 determines the response based on a computation of an expected wait time at the at least one POS system 112 being greater than a predetermined threshold wait time. The processing unit 106 can calculate the wait time at the POS system 112 based on the cluster of user devices 104 moving toward the POS system 112. In exemplary embodiments, the processing unit 106 may issue an alert to an employee of a retail store indicating the expected wait time is greater than a predetermined threshold amount.

In exemplary embodiments, the user devices 104 may be a mobile phone, a portable digital assistant, a laptop computer, a tablet device, a wearable computing device or a wireless portable device. The network devices 202a-d may be distributed throughout the facility 100 in at least one of a clustered pattern relative to a location of one or more items in the facility 100 or a gridded pattern. The clustered pattern may assist in determining projected path of a cluster of user devices 104 headed to important locations throughout the facility 100. The gridded pattern may assist in providing the user devices 104 a stronger network connection within the facility 100.

Figure 3:
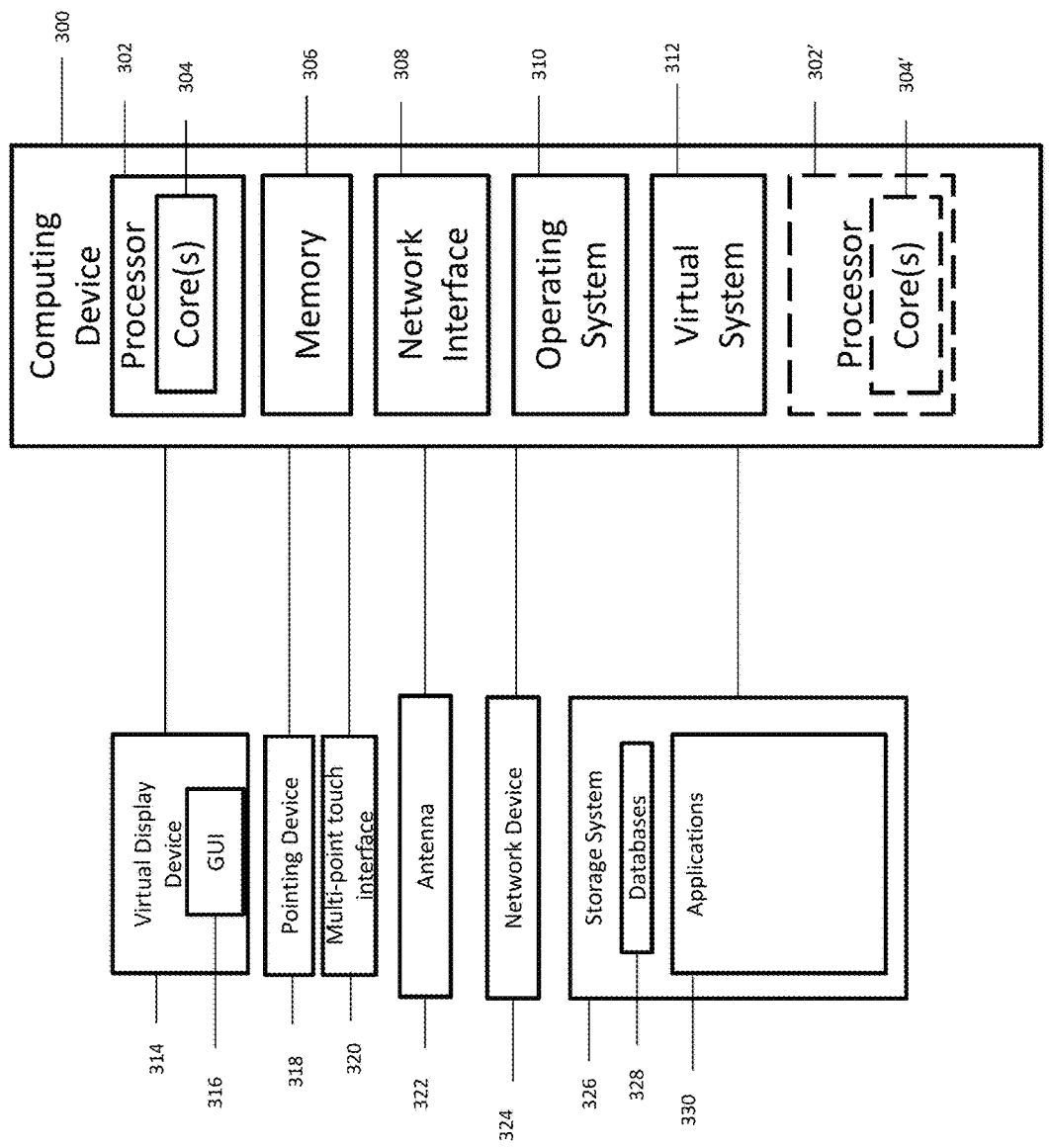
FIG. 3 is a block diagram of an example computing device for implementing exemplary embodiments of the present disclosure.

FIG. 3 is a block diagram of an example computing device for implementing exemplary embodiments of the present disclosure. In exemplary embodiments, the computing device 300 may implement embodiments of computing system 106 or the user device 104. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing system 300 may store computer-readable and computer-executable instructions or software (e.g., applications 330) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with processing unit 106.

Virtualization may be employed in the computing system 300 so that infrastructure and resources in the computing system 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing system 300 through a visual display device 314, such as a computer monitor, which may display one or more graphical user interfaces 316, multi touch interface 320, and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information, such as current product data including current pricing, market rules, and price gap goals and suggested data for storing the calculated new pricing suggested data. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 108 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
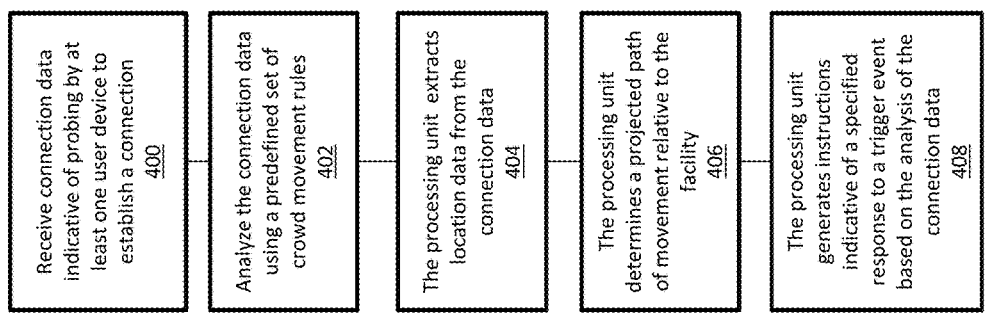
FIG. 4 is a flowchart illustrating an exemplary process for a tracking system in accordance with exemplary embodiments of the present disclosure.

FIG. 4 is a flowchart illustrating an exemplary process for a tracking detection system in accordance with exemplary embodiments of the present disclosure. In exemplary embodiments, in operation 400 a plurality of network devices 102, distributed throughout a facility 100, receive connection data indicative of probing by at least one user device 104 to establish a connection. The network devices 102 may be WiFi receivers, Bluetooth access points, beacon sensors or other Near Field Communications (NFC) devices. In exemplary embodiments, the user devices 104 may be a mobile phone, a portable digital assistant, a laptop computer, a tablet device, a wearable computing device or a wireless portable device. The network devices 104 may be distributed throughout the facility 100 in at least one of a clustered pattern relative to a location of one or more items in the facility 100 or a gridded pattern. The clustered pattern may assist in determining projected path of a cluster of user devices 104 headed to important locations throughout the facility 100. The gridded pattern may assist in providing the user devices 104 a stronger network connection within the facility 100. A user device 104 may search for the closest network devices 102. The user device 104 may detect one or more network devices 102 if the user device 104 moves in the range of the network devices 102. The user device 104 may issue a request to the user to confirm if they wish to connect to the detected network devices 102. In exemplary embodiments, probing may occur when the network device detects a handshake between the user device 104 and network device 102. The automated process of data exchange of the handshake can dynamically set parameters of a communications channel established between two entities before normal communication over the channel begins. Handshaking can cause exchange of parameters that are acceptable to equipment and systems at both ends of the communication channel, including, but not limited to, information transfer rate, coding alphabet, parity, interrupt procedure, and other protocol or hardware features. In exemplary embodiments, the network device 102 does not need the user device 104 to establish a full connection with the network device 102 for the network device 102 to detect the handshake as an attempt at probing. The network device 102 can detect the user device's 104 acknowledgment that a network device 102 is available for connection.

In operation 402, at least one processing unit 106, communicatively coupled to the plurality of network devices 102, collects and analyzes the connection data from a plurality of user devices 104 using a predefined set of user device clustering rules.

In operation 404, the processing unit 106 extracts location data from the connection data. The location data represents the location within the facility 100 where the network device 102 detected a handshake connection with the user device 104 (e.g., as a form of probing).

In operation 406, the processing unit 106 determines a projected path of movement relative to the facility 100 of at least one user device, based on the analysis of the connection data and the location data. For example, the user device 104 may automatically cycle as the it moves throughout the facility 100 to detect various network devices 102. The network devices 102 may detect different handshake data (i.e., data indicative of probing) at various locations for the same user device 104. Based on the different location data for the same user device 102, received by the processing unit 106 the processing unit 106 may be able to project the direction the user device 104 is moving and thus, determine a projected path for the user device 104. The processing unit 106 may be used to determine whether a cluster of user devices 104 has been detected based on the quantity of connection data and location data. For example, the processing unit 106 may be used to analyze the connection and location data for a plurality of user devices 104 based on a predefined set of user device clustering rules. In exemplary embodiments, a cluster of user devices may be an amount of user devices more than the predetermined threshold amount within a predetermined distance of each other for a same predetermined threshold of time. The processing unit 106 may determine a cluster of connection data from various user devices 104 in a single location within the facility 100. The processing unit 106 may determine a projected path for the plurality of user devices 104 in the cluster and determine that more than predetermined threshold number of user devices are headed toward a particular direction within the facility 100 and may designate the user devices as a cluster of user devices. In exemplary embodiments, the pre-determined threshold number may be any number greater than 0 representing a cluster.

In operation 408, the processing unit 106 may generate instructions indicative of a specified response to a trigger event based on the analysis of the connection data using the predefined set of user device clustering rules and the projected path of the cluster of user devices. In some embodiments, the response may be that the processing unit 106 issues an alert indicating the projected path of the cluster of user devices 104. The processing unit 106 may be used to determine if more than a predetermined threshold number of user devices 104 are moving towards an expected location. The processing unit may issue an alert of the quantity of user devices in the cluster of user devices. In another embodiment, the processing unit 106 may issue an alert indicating the expected location of the cluster of user devices.

In another embodiment, the response may be the processing unit 106 may determine the expected location is an item scanning location. The processing unit 106 determines the determines the response based on a computation of an expected wait time at the at least one item scanning unit being greater than a predetermined threshold wait time. In exemplary embodiments, the processing unit 106 can calculate the wait time based on the cluster of user devices 104 moving toward the item scanning location. The processing unit 106 may issue an alert indicating the expected wait time is greater than a predetermined threshold amount.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A tracking system comprising:
   a plurality of network devices distributed throughout a facility, each network device of the plurality of network devices being configured to receive connection data indicative of probing by at least one user device to establish a connection; and at least one processing unit communicatively coupled to the plurality of network devices, the at least one processing unit being programmed to:

analyze the connection data using a predefined set of user device clustering rules;

extract location data from the connection data, wherein the location data is indicative of a location as a function of time of the at least one user device relative to the facility;

determine a projected path of movement relative to the facility of the at least one user device, based on the analysis of the connection data and the location data; and generate instructions indicative of a specified response to a trigger event based on the analysis of the connection data using the predefined set of user device clustering rules and the projected path of the at least one user device, wherein the response is one or more of issuing an alert indicating the projected path of the at least one user device, issuing an alert indicating that more than a predetermined threshold number of user devices are moving towards an expected location, and issuing an alert indicating that more than a predetermined threshold number of user devices are moving towards an item scanning location.

2. The system of claim 1, wherein the at least one user device is a plurality of user devices, and wherein the at least one processing unit is further programmed to determine if more than a predetermined number of the plurality of user devices are moving towards a specified location relative to the facility within a predetermined period of time.

3. The system in claim 1, the plurality of network devices comprises one or more of: a wireless local area network access point, a near field communication access point, or a beacon sensor.

4. The system in claim 1, wherein the at least one user device is one or more of: a mobile phone, a portable digital assistant, a laptop computer, a tablet device, wearable computing device or a wireless portable device.

5. The system in claim 3, wherein the at least one processing device is further programmed to locate the at least one user device by extracting connection data of two or more network devices that have received connection data associated with a single user device.

6. The system in claim 1, wherein the item scanning location is at least one Point-of-Sale (POS) system.

7. The system in claim 6, wherein the at least one processing unit determines the response based on a computation of an expected wait time at the at least one POS system being greater than a predetermined threshold wait time.

8. The system in claim 7, wherein, in response to determining the expected wait time as being greater than the predetermined threshold wait time, the at least one processing unit is further programmed to issue an alert indicating the expected wait time.

9. The system in claim 1, wherein the network devices are distributed throughout the facility in at least one of: a clustered pattern relative to a location of one or more items in the facility, or a gridded pattern.

10. A method for tracking clustering of user devices, the method comprising:

receiving, via each one of a plurality of network devices distributed throughout a facility, connection data indicative of probing by at least one user device to establish a connection;

analyzing, via at least one processing unit communicatively coupled to the plurality of network devices, the connection data using a predefined set of user device clustering rules;

extracting, via the at least one processing unit, location data from the connection data, wherein the location data is indicative of a location as a function of time of the at least one user device relative to the facility;

determining, via the at least one processing unit, a projected path of movement relative to the facility of the at least one user device, based on the analysis the connection data and the location data; and generating, via the at least one processing unit, instructions indicative of a specified response to a trigger event based on the analysis of the connection data using the predefined set of user device clustering rules and the projected path of the at least one user device, wherein the response is one or more of issuing an alert indicating the projected path of the at least one user device, issuing an alert indicating that more than a predetermined threshold number of user devices are moving towards an expected location, and issuing an alert indicating that more than a predetermined threshold number of user devices are moving towards an item scanning location.

11. The method of claim 10, wherein the at least one user device is a plurality of user devices, and wherein the at least one processing unit is further programmed to determine if more than a predetermined number of the plurality of user devices are moving towards a specified location relative to the facility within a predetermined period of time.

12. The method in claim 10, the plurality of network devices comprises one or more of: a wireless local area network access point, a near field communication access point, or a beacon sensor.

13. The method in claim 10, wherein the at least one user device is one or more of a: a mobile phone, a portable digital assistant, a laptop computer, a tablet device, wearable computing device or a wireless portable device.

14. The method in claim 12, further comprising locating, via the at least one processing device, the at least one user device by extracting connection data of two or more network devices that have received connection data associated with a single user device.

15. The method in claim 10, wherein the item scanning location is at least one Point-of-Sale (POS) system.

16. The method in claim 15, further comprising determining, via the at least one processing unit, the response based on a computation of an expected wait time at the at least one POS system that is greater than a predetermined threshold wait time.

17. The method in claim 16, further comprising, in response to determining the expected wait time being greater than the predetermined threshold wait time, issuing, via the at least one processing unit, an alert indicating the expected wait time.

18. The system in claim 10, wherein the network devices are distributed throughout the facility in at least one of: a clustered pattern relative to a location of one or more items in the facility, or a gridded pattern.

* * * * *